US012292178B1

(12) United States Patent

Wang et al.

(10) Patent No.: US 12,292,178 B1
(45) Date of Patent: May 6, 2025

(54) PLUG-IN LAMP WITH DISORDERED STEM BUNDLING DEVICE

(71) Applicant: FULIJIATE NANTONG NEW ENERGY TECHNOLOGY CO., LTD., Nantong (CN)

(72) Inventors: Qingquan Wang, Nantong (CN); Zengming Ning, Nantong (CN)

(73) Assignee: FULIJIATE NANTONG NEW ENERGY TECHNOLOGY CO., LTD., Nantong (CN)

( * ) Notice: Subject to any disclaimer, the term of this patent is extended or adjusted under 35 U.S.C. 154(b) by 0 days.

(21) Appl. No.: 18/625,680

(22) Filed: Apr. 3, 2024

(30) Foreign Application Priority Data

Mar. 26, 2024 (CN) ......................... 202410352460.4

(51) Int. Cl.

| | |
|---|---|
| ***F21V 17/10*** | (2006.01) |
| ***F21S 9/03*** | (2006.01) |
| ***F21V 21/08*** | (2006.01) |
| ***F21V 21/32*** | (2006.01) |

(52) U.S. Cl.

CPC ................ *F21V 17/10* (2013.01); *F21S 9/03* (2013.01); *F21V 21/0824* (2013.01); *F21V 21/32* (2013.01)

(58) Field of Classification Search

CPC .... F21V 21/0824; F21V 21/32; F21V 21/088; F21V 17/10; A47G 7/07; A41G 1/005; F21W 2131/109; A01G 9/128; A01G 5/02

See application file for complete search history.

(56) References Cited

U.S. PATENT DOCUMENTS

| | | | | |
|---|---|---|---|---|
| 2003/0089033 A1* | 5/2003 | Wimp, Jr. | ................ | A01G 5/04 47/41.11 |
| 2007/0002561 A1* | 1/2007 | Tesmer | .................. | F24S 30/48 362/276 |
| 2022/0034494 A1* | 2/2022 | Xu | ...................... | F21V 21/0824 |

FOREIGN PATENT DOCUMENTS

| | | | | |
|---|---|---|---|---|
| KR | 102352379 B1 * | 1/2022 | | |
| WO | WO-2007000613 A1 * | 1/2007 | ................ | F21S 9/03 |

* cited by examiner

*Primary Examiner* — Erin Kryukova

(74) *Attorney, Agent, or Firm* — Daniel M. Cohn

(57) ABSTRACT

Disclosed is a plug-in lamp with a disordered stem bundling device, including a plug-in stake and a bundling device, wherein an unburied end of the plug-in stake is provided with a mounting portion with a built-in main control board, and a plurality of strip-shaped imitation flower stem connectors are arranged around a side edge of the mounting portion; a plurality of notches for inserting the imitation flower stem connectors are arranged around an edge of the bundling device, and the spacing between any two adjacent notches is unequal. Through the cooperation of the bundling device and the imitation flower stem connectors, the imitation flower stem connectors are in a disorderly hanging state, making the plug-in lamp have a better decoration effect.

10 Claims, 6 Drawing Sheets

PLUG-IN LAMP WITH DISORDERED STEM BUNDLING DEVICE

BACKGROUND OF THE INVENTION

1. Technical Field

The present invention relates to the field of plug-in lamps and, in particular, to a plug-in lamp with a disordered stem bundling device.

2. Description of Related Art

As a kind of lamp for urban lighting and garden beautification, plug-in lamps can be used for decorative lighting in parks, villa gardens, lawn in the square and other places. Because plug-in lamps can increase safety and beauty to urban green spaces and landscapes and are generally easy to install with good decoration effect, they are very popular.

However, in the prior art, a plug-in lamp usually includes a plug-in stake and a lamp body located at an unburied end of the plug-in stake. When used, the plug-in lamp is found to have the following disadvantages: 1. Difficult power wiring and need of power supply from a distribution point impose strict power supply conditions on the installation site. 2. Since the plug-in lamp is often set up on garden greenways or between green plants and its structure is simple without relevant adjustment components, it is difficult to create a good artistic atmosphere together with an installation environment and achieve a good installation effect. It can be seen that a plug-in lamp with a more reasonable structure that can better coordinate with the environment to create a good artistic atmosphere is an urgent need of the society.

BRIEF SUMMARY OF THE INVENTION

The present invention provides a solution to address the technical problems in the prior art that the plug-in lamp with a simple structure cannot create a good atmosphere together with its installation environment and thus has a poor decoration effect.

To achieve the above objective, the present invention provides a plug-in lamp with a disordered stem bundling device, including:

- a plug-in stake, wherein an unburied end of the plug-in stake is provided with a mounting portion with a built-in main control board, a plurality of strip-shaped imitation flower stem connectors are arranged around a side edge of the mounting portion, and an end of any one of the imitation flower stem connectors away from the mounting portion is connected to at least one first light-emitting unit; and
- a bundling device, wherein a plurality of notches for inserting the imitation flower stem connectors are arranged around an edge of the bundling device, and the spacing between any two adjacent notches is unequal so that the imitation flower stem connectors are in a disorderly hanging state.

The plug-in lamp further includes an imitation flower rod member, which is fixedly connected to a side of the mounting portion away from the plug-in stake; the bundling device is movablely fitted over the imitation flower rod member.

A cylindrical surface of the imitation flower rod member is also provided with limiting grooves, and the limiting grooves extend to two ends of the imitation flower rod member; the bundling device is provided with anti-slip protrusions 61 that match the limiting grooves.

An end of the imitation flower rod member away from the mounting portion is further provided with a solar panel, and the solar panel is electrically connected to the main control board.

The length of the imitation flower rod member is greater than the length of any one of the imitation flower stem connectors.

A plurality of second light-emitting units are arranged on a side of the main control board close to the bundling device, and light formed when the second light-emitting units work passes through the mounting portion and comes into the environment.

The side of the main control board close to the bundling device is further provided with an optical plate, and the optical plate is provided with a reflection avoidance groove at a position corresponding to any one of second light-emitting units.

The connector has a built-in conductive wire having one end connected to the first light-emitting unit and the other end connected to the main control board.

An iron wire is also provided in the imitation flower stem connector, and the iron wire extends to two ends of the imitation flower stem connector; the material of the imitation flower stem connector is softer than that of the iron wire.

A side of the mounting portion away from the bundling device is also provided with a button electrically connected to the main control board.

Beneficial effects of the invention: Compared with the prior art, the present application provides a plug-in lamp with a disordered stem bundling device, including a plug-in stake and a bundling device, wherein an unburied end of the plug-in stake is provided with a mounting portion with a built-in main control board, a plurality of strip-shaped imitation flower stem connectors are arranged around a side edge of the mounting portion, and an end of any one of the imitation flower stem connectors away from the mounting portion is connected to at least one first light-emitting unit; a plurality of notches for inserting the imitation flower stem connectors are arranged around an edge of the bundling device, and the spacing between any two adjacent notches is unequal. Through the cooperation of the bundling device and the imitation flower stem connectors, the imitation flower stem connectors are in a disorderly hanging state, making the plug-in lamp have a better decoration effect. When the plug-in lamp is installed in a site with green plants, the plurality of imitation flower stem connectors cooperate with first light-emitting units during operation to achieve mutual synergy with the site with green plants and create an atmosphere like a firefly colony flying in the site with green plants. In this way, the plug-in lamp achieves a better lighting decoration effect.

and

Figure 1:
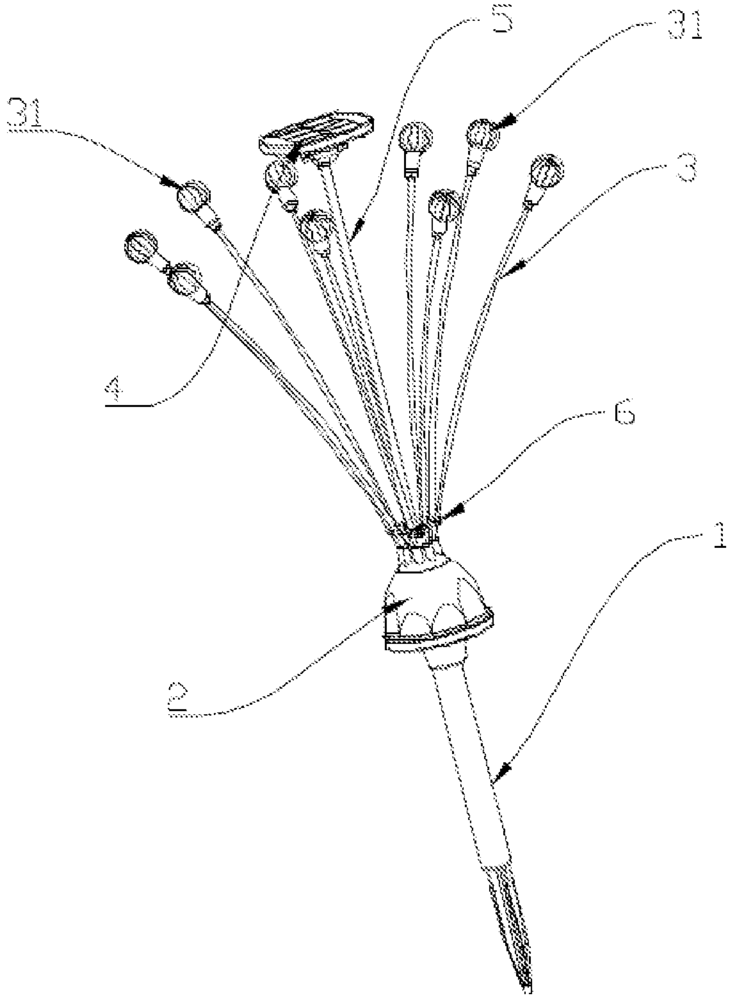
FIG. 1 is a perspective diagram of the present invention.
Figure 2:
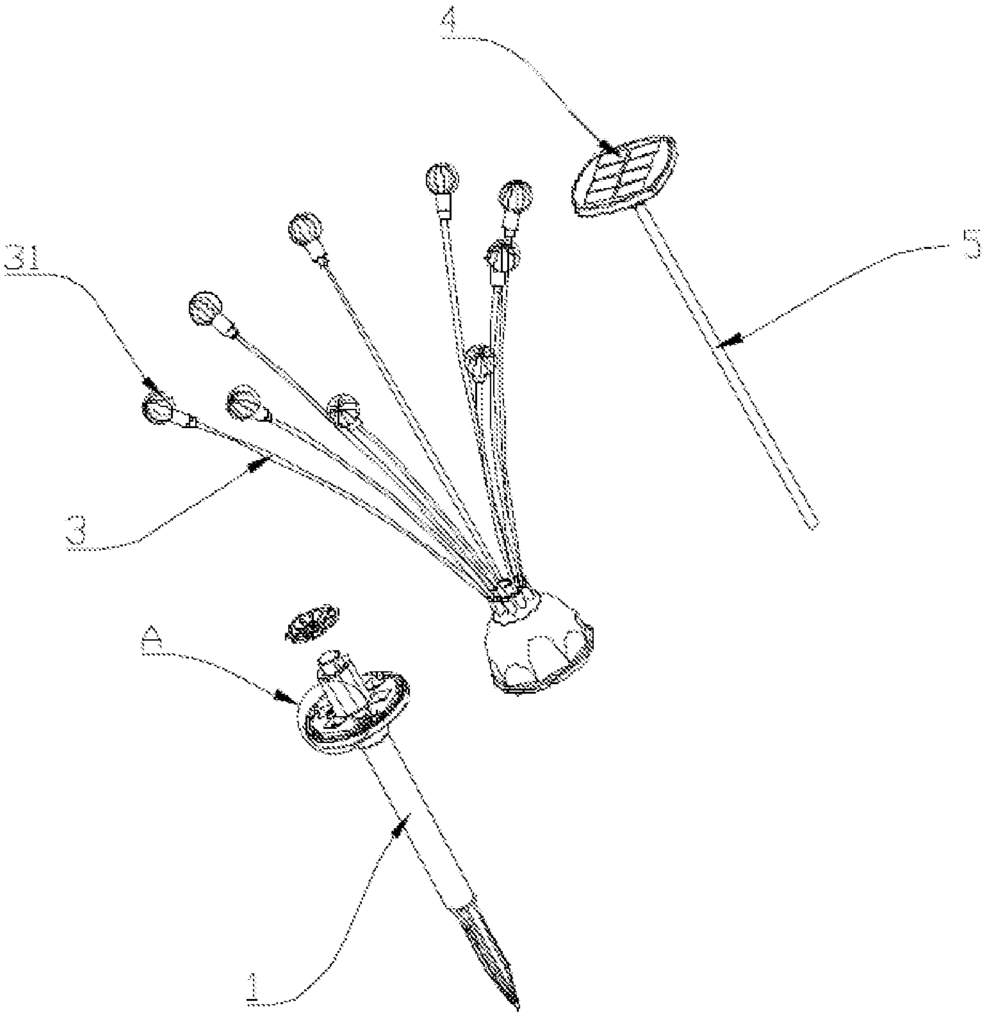
FIG. 2 is an exploded diagram of the present invention.
Figure 3:
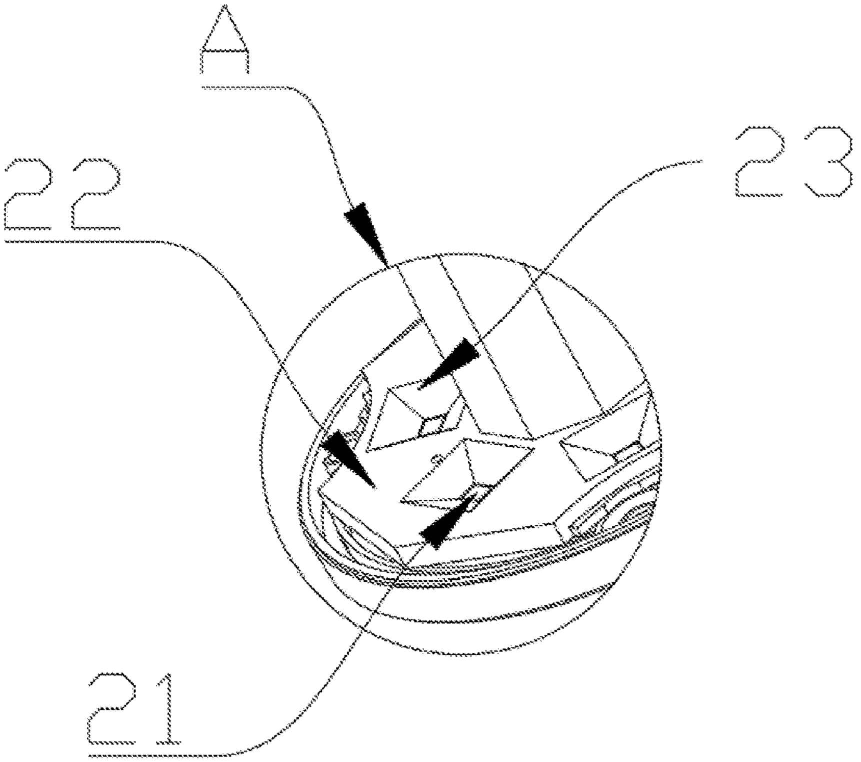
FIG. 3 is an enlarged diagram of area A of FIG. 3 of the present invention.
Figure 4:
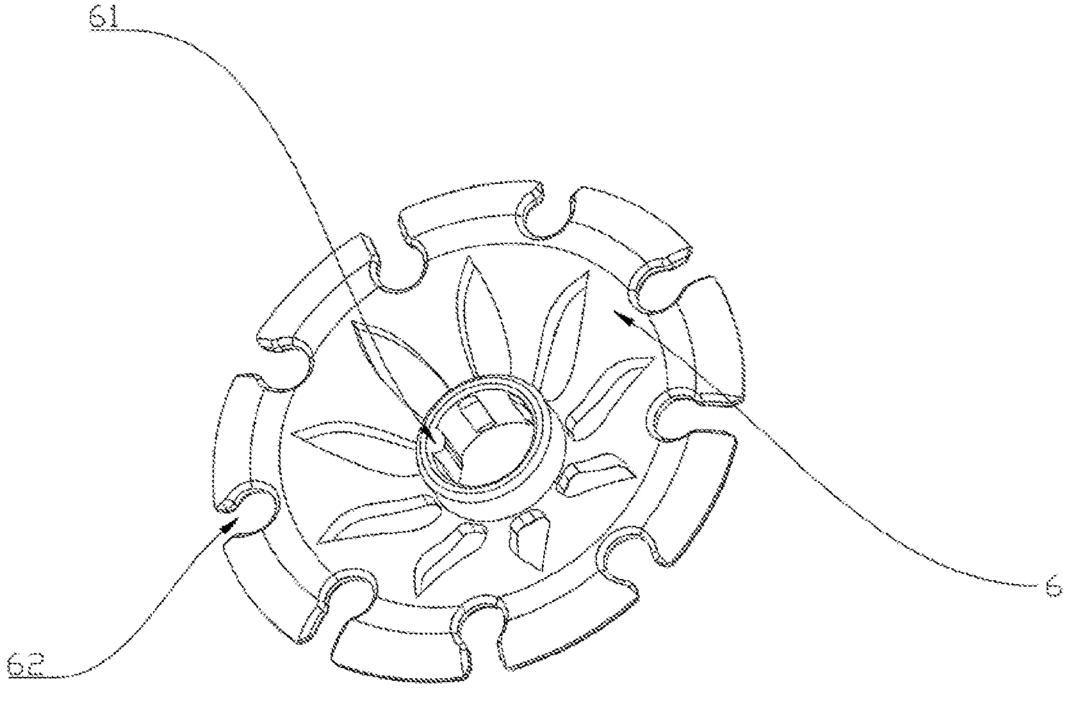
FIG. 4 is a schematic diagram of a bundling device of the present invention.
Figure 5:
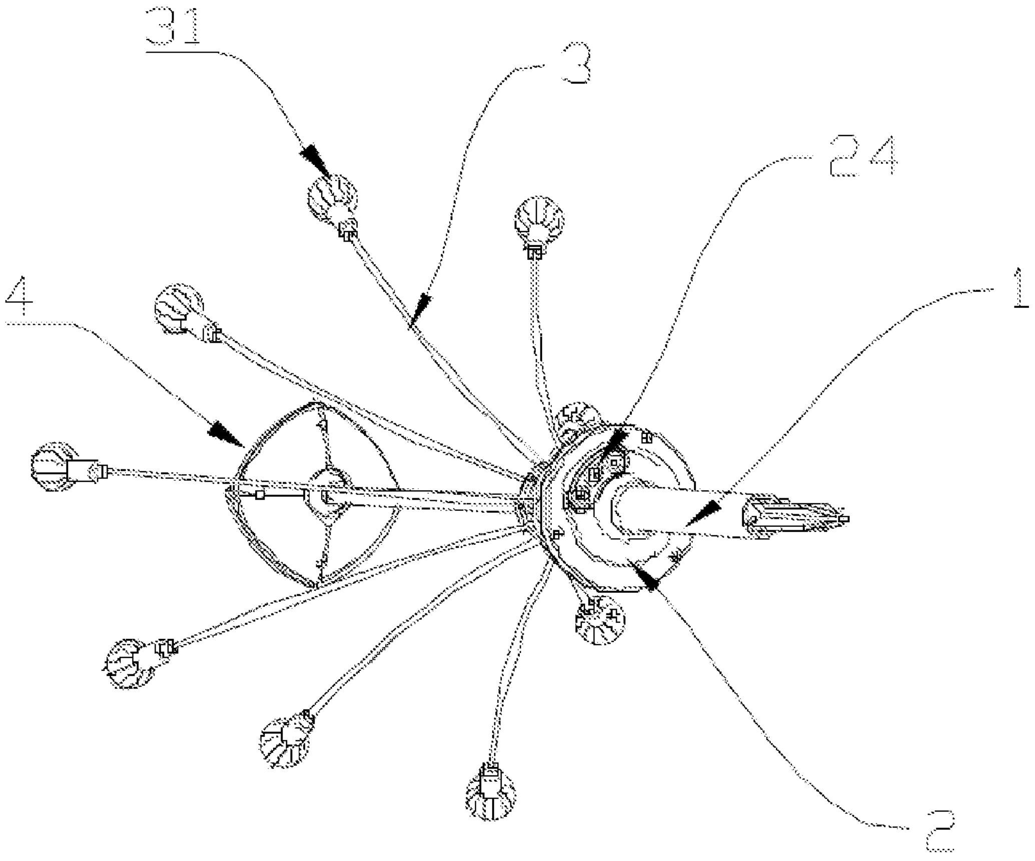

FIG. 5 is a perspective diagram of the present invention from another angle.

Figure 6:
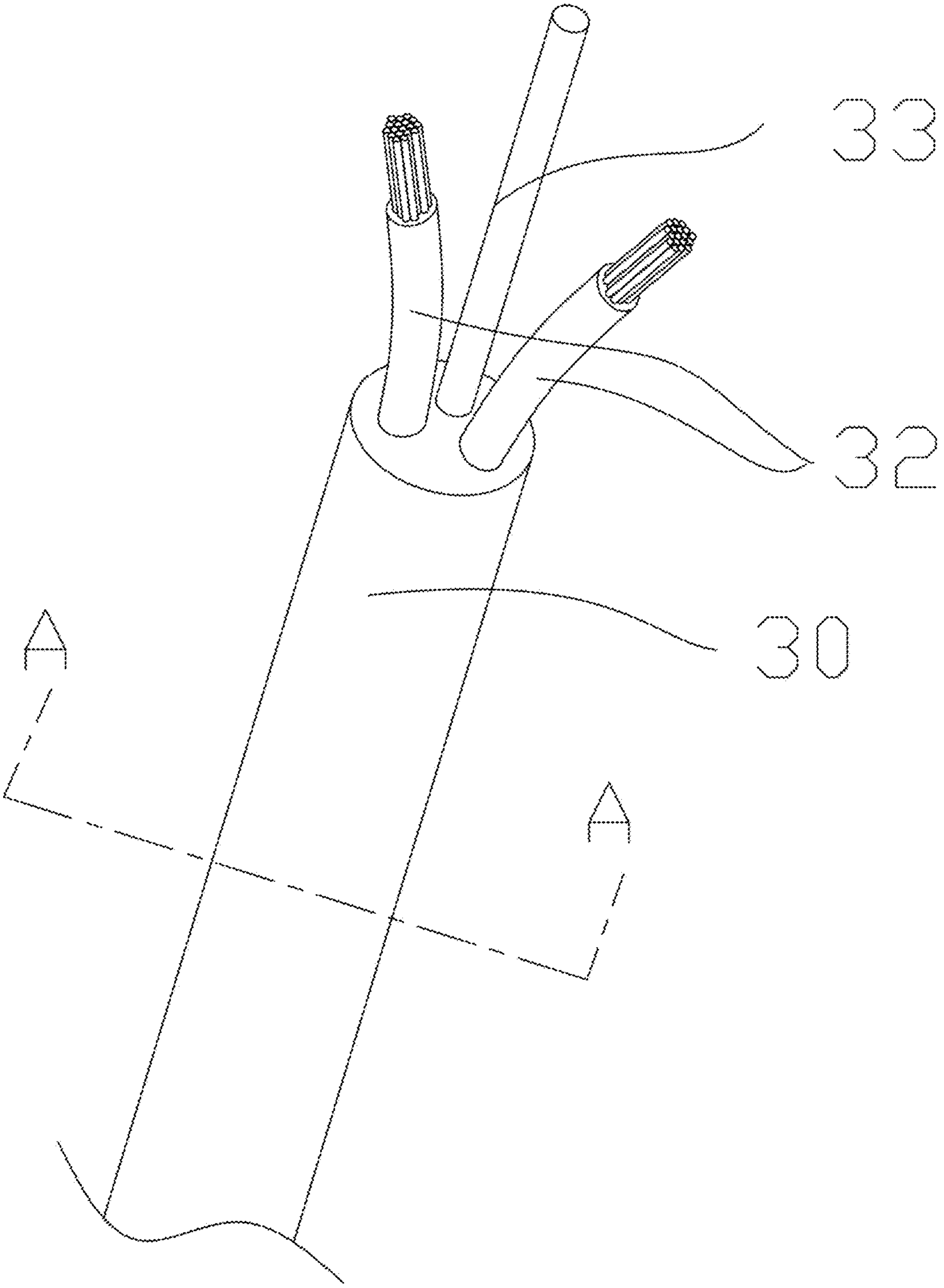

FIG. 6 is a partial schematic diagram of an imitation flower stem connector, where conductive wires and an iron wire thereof are partially exposed.

Figure 7:
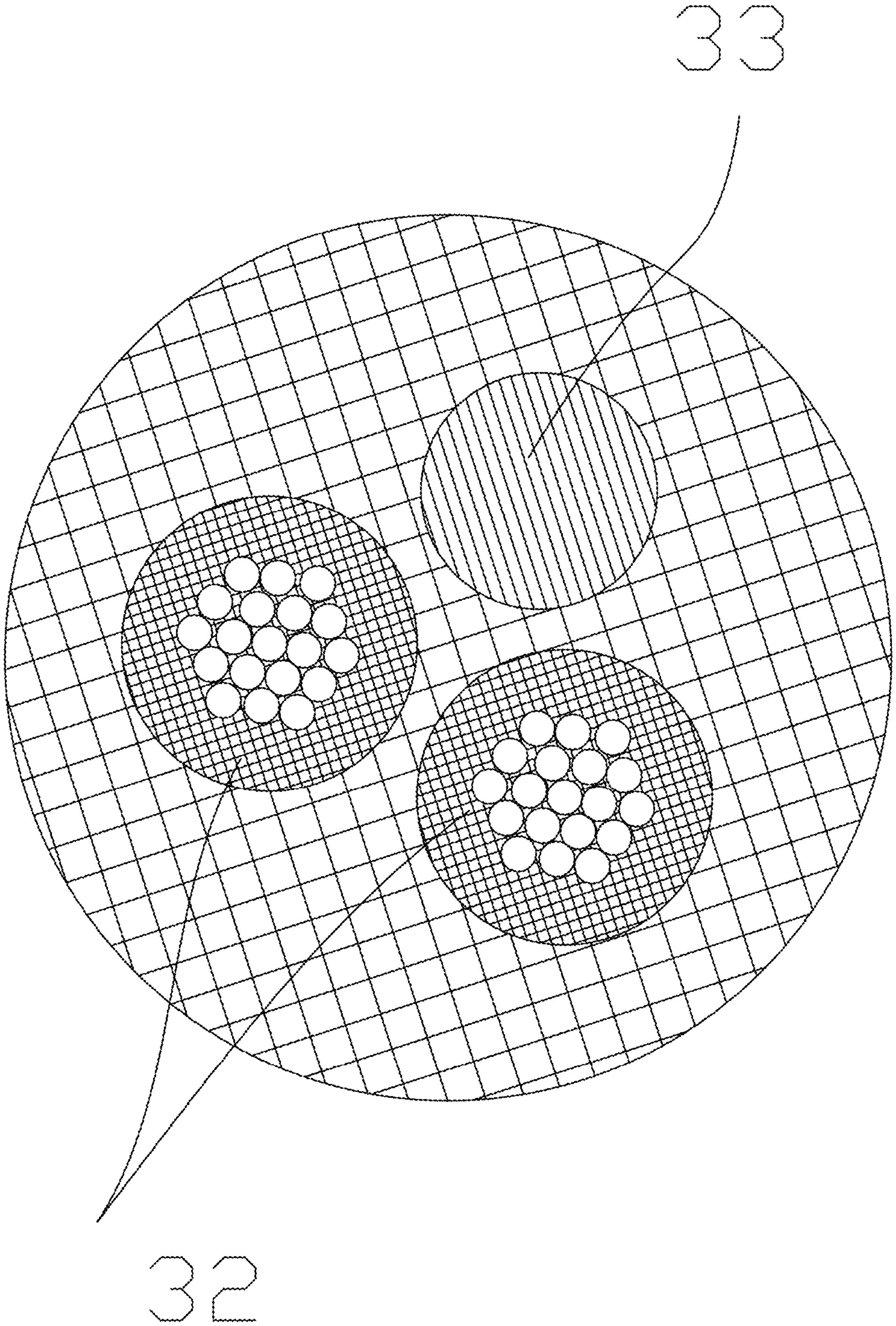

FIG. 7 is schematic diagram of the imitation flower stem connector taken along the line A-A shown in FIG. 6.

Reference numerals of main components are described as follows:

1. Plug-in stake; 2. mounting portion; 21. second light-emitting unit; 22. optical plate; 23. reflection avoidance groove;

24. button; 3. imitation flower stem connector; 31. first light-emitting unit; 4. solar panel;

5. imitation flower rod member; 6. bundling device; 61. limiting protrusion; 62. notch.

DETAILED DESCRIPTION OF THE INVENTION

In order to more clearly illustrate the invention, the invention will be further described below in conjunction with the accompanying drawings.

In the following description, example details are given in order to provide a deeper understanding of the invention. Obviously, the described embodiments are only some of the embodiments of the invention, but not all of the embodiments. It should be understood that the specific embodiments are only used to explain the invention and are not intended to limit the invention.

It should also be understood that when the terms "include" and/or "including" are used in this description, they indicate the presence of features, integers, steps, operations, elements and/or components, but do not exclude the presence or addition of one or multiple other features, integers, steps, operations, elements, components or combinations thereof.

However, in the prior art, a plug-in lamp usually includes a plug-in stake and a lamp body located at an unburied end of the plug-in stake. When used, the plug-in lamp is found to have the following disadvantages: 1. Difficult power wiring and need of power supply from a distribution point impose strict power supply conditions on the installation site. 2. Since the plug-in lamp is often set up on garden greenways and its structure is simple without relevant adjustment components, it is difficult to create a good artistic atmosphere together with an installation environment and achieve a good installation effect. It can be seen that a plug-in lamp with a more reasonable structure that can better coordinate with the environment to create a good artistic atmosphere is an urgent need of the society.

In order to solve the technical problems stated above, the present application provides a plug-in lamp with a disordered stem bundling device, with reference to FIGS. 1-5, including a plug-in stake 1 and a bundling device 6, wherein an unburied end of the plug-in stake 1 is provided with a mounting portion 2 with a built-in main control board, a plurality of strip-shaped imitation flower stem connectors 3 are arranged around a side edge of the mounting portion 2, and an end of any one of the imitation flower stem connectors 3 away from the mounting portion is connected to at least one first light-emitting unit 31; a plurality of notches 62 for inserting the imitation flower stem connectors are arranged around an edge of the bundling device 6, and the spacing between any two adjacent notches is unequal. Through the cooperation of the bundling device 6 and the imitation flower stem connectors 3, the imitation flower stem connectors 3 are in a disorderly hanging state, making the plug-in lamp have a better decoration effect. When the plug-in lamp is installed in a site with green plants, the plurality of imitation flower stem connectors 3 cooperate with first light-emitting units 31 during operation to achieve mutual synergy with the site with green plants and create an atmosphere like a firefly colony flying in the site with green plants. In this way, the plug-in lamp achieves a better lighting decoration effect.

In this embodiment, the plug-in lamp further includes an imitation flower rod member 5, which is fixedly connected to a side of the mounting portion 2 away from the plug-in stake 1; the bundling device 6 is movably fitted over the imitation flower rod member 5. It is easy to understand that the imitation flower stem connectors 3 have a certain degree of flexibility, and by sliding the bundling device 6, the imitation flower stem connectors 3 can have different hanging effects, which can be understood as imitating the hanging state of leaves of long-leaved plants such as leaves of spider plants and orchids. In practical applications, through sliding adjustment of the bundling device 6, the plug-in lamp can coordinate with vegetation of different heights, and will not create a sense of disharmony due to height unmatching with plants in the surroundings. In an actual solution, a plurality of notches 62 are arranged around the edge of the bundling device 6, and a fixing notch fixes the connector. The imitation flower stem connectors 3 which have a certain degree of flexibility can better imitate the flower stem parts of real plants. The simulation effect is more vivid when the plug-in lamp is blown by natural wind. Moreover, the plug-in lamp is more stable in structure and thus has a longer service life.

In a further solution, a cylindrical surface of the imitation flower rod member 5 is also provided with limiting grooves, and the limiting grooves extend to two ends of the imitation flower rod member 5; the bundling device 6 is provided with anti-slip protrusions 61 that match the limiting grooves; an inner wall of the bundling device 6 is provided with the limiting protrusions 61 that match the limiting grooves. The limiting grooves work together with the limiting protrusions 61, so that the bundling device 6 can slide smoothly and stably on the imitation flower rod member 5.

In a further solution, an end of the imitation flower rod member 5 away from the mounting portion 2 is further provided with a solar panel 4, and the solar panel 4 is electrically connected to a main control board; the solar panel 4 is placed on a side of the mounting portion away from the plug-in stake, and the solar panel 4 is electrically connected to the main control board. By using the solar panel for power supply, the shortcoming of difficult wiring for the plug-in lamp is overcome.

In a further solution, the length of the imitation flower rod member 5 is greater than the length of any one of the imitation flower stem connectors 3. By virtue of the imitation flower rod member 5, the installation height of the solar panel 4 is higher than the height of the first light-emitting unit 31 and the first light-emitting unit 31 will not block the solar panel 4, thereby ensuring that the solar panel 4 absorbs sunlight and converts it into electrical energy for storage, without being affected by obstructions. The solar panel 4 and the imitation flower rod member 5 may also be movably connected by virtue of hinges, spherical hinges, magnetic structures, etc., so that the solar panel 4 can be adjusted to be perpendicular to the sunlight. In this way, the duration and intensity of sunshine can be maintained, thereby ensuring the reliability of power supply.

Although a plurality of first light-emitting units 31 may be provided, the first light-emitting units 31 are configured to simulate the light effect of fireflies, so the light-emitting brightness of the first light-emitting units 31 should not be high. In order to increase the brightness of the plug-in lamp to improve adaptability, in this embodiment, a plurality of second light-emitting units 61 are arranged on a side of the main control board close to the bundling device 6, and light formed when the second light-emitting units 61 work passes through the mounting portion 2 and comes into the environment. It is easy to understand that since the plurality of second light-emitting units 21 work together, a larger lighting area and high brightness can be realized. As a result, this product can be installed on both sides of a footpath in a garden and used as a lighting lamp. When installed in gaps between green plants, this product can further illuminate surrounding plants and also achieve a more harmonious lighting decoration effect together with the first light-emitting units 31.

In a specific solution, the side of the main control board close to the bundling device is further provided with an optical plate 22, and the optical plate 22 is provided with a reflection avoidance groove 23 at a position corresponding to any one of second light-emitting units 21; the reflection avoidance grooves 23 can evenly disperse the light formed by the second light-emitting units 22 into the environment. In this way, the mounting portion has a softer lighting effect, which will not cause dizziness to users easily.

Regarding the wiring of the first light-emitting unit 31, specifically: the imitation flower stem connector 3 has a built-in conductive wire 32 having one end connected to the first light-emitting unit 31 and the other end connected to the main control board. In a more optimal solution, in order to further increase the strength of the imitation flower stem connector 3, an iron wire 33 is also provided in the imitation flower stem connector 3, and the iron wire 33 extends to two ends of the imitation flower stem connector 3; the material of the connector is softer than that of the iron wire; the connector is made of a plastic material, which makes the connector have good touch feel, hardness and electric conduction.

A side of the mounting portion 2 away from the bundling device 6 is also provided with a button 24 electrically connected to the main control board. When the button 24 is pressed down, the main control board controls the first light-emitting units 31 and the second light-emitting units 21 to work in response to the pressed state.

The present invention has the following advantages.

1) The bundling device is configured to work with the imitation flower stem connectors so that the imitation flower stem connectors are in a disorderly hanging state. In this way, the plug-in lamp achieves a better decoration effect.

2) When the plug-in lamp is installed in a site with green plants, the plurality of imitation flower stem connectors 3 cooperate with first light-emitting units during operation to achieve mutual synergy with the site with green plants and create an atmosphere like a firefly colony flying among the green plants. In this way, the plug-in lamp achieves a better lighting decoration effect.

The above disclosure is only a few specific embodiments of the invention, but the invention is not limited thereto, and any changes that can be conceived of by those skilled in the art should fall within the scope of the invention.

What is claimed is:

1. A lamp with a disordered stem bundling device, comprising:

a stake, wherein an unburied end of the stake is provided with a mounting portion with a built-in main control board, a plurality of strip-shaped connectors are arranged around a side edge of the mounting portion, and an end of any one of the strip-shaped connectors away from the mounting portion is connected to at least one first light-emitting unit;

a bundling device, wherein a plurality of notches for inserting the strip-shaped connectors are arranged around an edge of the bundling device, and the spacing between any two adjacent notches is unequal so that the strip-shaped connectors are in a disorderly hanging state; and a rod member fixedly connected to a side of the mounting portion away from the stake;

wherein the bundling device is movably fitted over the rod member.

2. The lamp with a disordered stem bundling device according to claim 1, wherein a cylindrical surface of the rod member is provided with limiting grooves, and the limiting grooves extend to two ends of the rod member; the bundling device is provided with anti-slip protrusions 61 that match the limiting grooves.

3. The lamp with a disordered stem bundling device according to claim 2, wherein an end of the rod member away from the mounting portion is further provided with a solar panel, and the solar panel is electrically connected to the main control board.

4. The lamp with a disordered stem bundling device according to claim 3, wherein the length of the rod member is greater than the length of any one of the strip-shaped connectors.

5. The lamp with a disordered stem bundling device according to claim 1, wherein a plurality of second light-emitting units are arranged on a side of the main control board close to the bundling device, and light formed when the second light-emitting units emit light passes through the mounting portion and comes into the environment.

6. The lamp with a disordered stem bundling device according to claim 5, wherein the side of the main control board close to the bundling device is further provided with an optical plate, and the optical plate is provided with a reflection avoidance groove at a position corresponding to any one of second light-emitting units.

7. The lamp with a disordered stem bundling device according to claim 1, wherein each of the strip-shaped connectors has a built-in conductive wire having one end connected to the at least one first light-emitting unit thereof and the other end connected to the main control board.

8. The lamp with a disordered stem bundling device according to claim 7, wherein an iron wire is provided in each of the strip-shaped connectors, and the iron wire extends to two ends of each of the strip-shaped connectors; a material of the strip-shaped connectors is softer than that of the iron wire.

9. The lamp with a disordered stem bundling device according to claim 1, wherein a side of the mounting portion away from the bundling device is provided with a button electrically connected to the main control board.

10. A lamp with a disordered stem bundling device, comprising:

a stake, wherein an unburied end of the stake is provided with a mounting portion with a built-in main control board, a plurality of strip-shaped connectors are arranged around a side edge of the mounting portion, and an end of any one of the strip-shaped connectors away from the mounting portion is connected to at least one first light-emitting unit;

a bundling device, wherein a plurality of notches for inserting the strip-shaped connectors are arranged around an edge of the bundling device, and the spacing between any two adjacent notches is unequal so that the strip-shaped connectors are in a disorderly hanging state;

wherein a plurality of second light-emitting units are arranged on a side of the main control board close to the bundling device, and light formed when the second light-emitting units emit light passes through the mounting portion and comes into the environment.

* * * * *